United States Patent
Eschmann et al.

(10) Patent No.: US 8,621,144 B2
(45) Date of Patent: Dec. 31, 2013

(54) ACCELERATED RESUME FROM HIBERNATION IN A CACHED DISK SYSTEM

(75) Inventors: Michael K. Eschmann, Lees Summit, MO (US); Wayne Allen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1001 days.

(21) Appl. No.: 12/215,235

(22) Filed: Jun. 26, 2008

(65) Prior Publication Data

US 2009/0327608 A1 Dec. 31, 2009

(51) Int. Cl.
*G06F 12/00* (2006.01)
*G06F 1/32* (2006.01)

(52) U.S. Cl.
USPC ............................ 711/113; 711/103; 713/324

(58) Field of Classification Search
None
See application file for complete search history.

(56) References Cited

U.S. PATENT DOCUMENTS

| | | | | |
|---|---|---|---|---|
| 5,557,739 | A  * | 9/1996 | Gupta et al. ..................... | 714/34 |
| 6,449,683 | B1 * | 9/2002 | Silvester ........................ | 711/103 |
| 6,968,450 | B1 * | 11/2005 | Rothberg et al. ................. | 713/1 |
| 2002/0073358 | A1 * | 6/2002 | Atkinson ........................ | 714/21 |
| 2003/0131206 | A1 * | 7/2003 | Atkinson et al. ................ | 711/156 |
| 2004/0064647 | A1 * | 4/2004 | DeWhitt et al. ................ | 711/135 |
| 2005/0086551 | A1 * | 4/2005 | Wirasinghe et al. .......... | 713/330 |
| 2007/0005928 | A1 * | 1/2007 | Trika et al. .................... | 711/202 |
| 2008/0082743 | A1 * | 4/2008 | Hanebutte et al. ............ | 711/113 |

OTHER PUBLICATIONS

Microsoft Corporation, "Windows PC Accelerator", Copyright 2006, Nov. 30, 2006, pp. 1-16.

* cited by examiner

*Primary Examiner* — Kaushikkumar Patel
(74) *Attorney, Agent, or Firm* — Christopher K. Gagne

(57) ABSTRACT

A non-volatile (NV) memory may store hiberfile data before entering a hibernate state, and retrieve the data upon resume from hibernation. The reserve space in the NV memory (i.e., the erased blocks available to be used while in the run-time mode) may be used to store hiberfile data. Further, a write-through cache policy may be used to assure that all of the hiberfile data saved in cache will also be stored on the disk drive during the hibernation, so that if the cache and the disk drive are separated during hibernation, the full correct hiberfile data will still be available for a resume operation.

22 Claims, 8 Drawing Sheets

ACCELERATED RESUME FROM HIBERNATION IN A CACHED DISK SYSTEM

BACKGROUND

Providing a non-volatile memory as a disk cache can permit improved response times for disk data during run time by keeping much of the most-used disk data available from cache, thus eliminating much of the seek- and spin-delays that are inherent in accessing the disk for every disk read. The disk cache may also be used for storing hiberfile data before the computer system enters a hibernate state. When the system recovers from the hibernate state by resuming operation, the hiberfile data in cache may be accessed before the disk has been spun up, thus shortening the resume time. However, this process has some problems. Evicting run-time user data from the cache to make room for the hiberfile data requires additional steps before entering hibernation, and so does recovering this user data during resume. These additional write operations also cause addition block erase operations on the non-volatile memory, thus shortening the effective operational life of that non-volatile memory.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
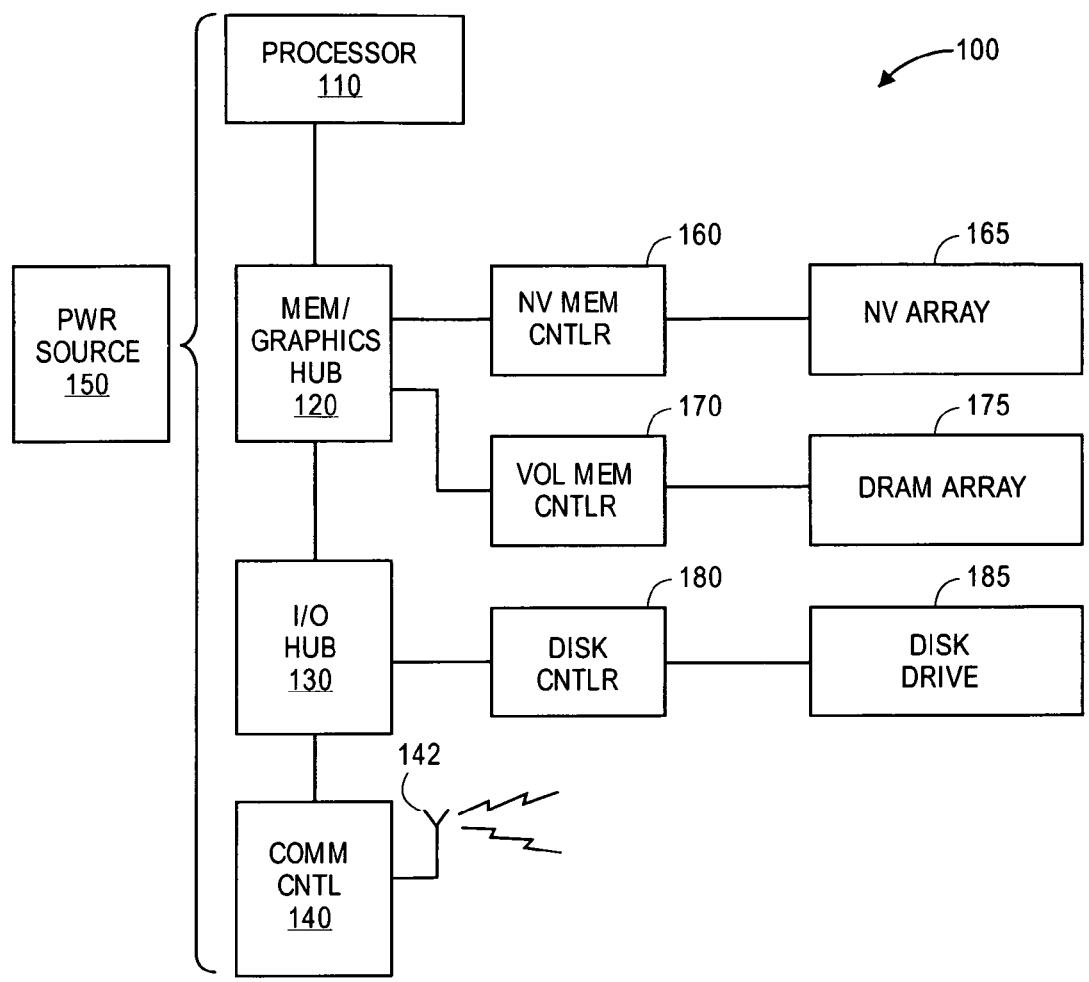
FIG. 1 shows a computer system, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

Various embodiments of the invention may use a non-volatile (NV) memory to store hiberfile data before entering a hibernation state, and retrieve the data upon resume from hibernation. Hibernation, sometimes referred to as 'suspend-to-disk', may store an image of the contents of volatile system memory onto disk before removing power from the system memory (thus losing those contents). This image is referred to as hiberfile data. Upon restoring power, that image may be quickly restored to system memory from the disk. By storing at least a part of the hiberfile data in a NV memory with faster access than the disk drive, the time to restore the system may be shortened. Unlike conventional systems, various embodiments of the invention may use the reserve space in the NV memory (i.e., the erased blocks available to be used while in the run-time mode) to store hiberfile data, thus permitting more of the hiberfile data to be saved in NV memory, and further shortening the restore time. Further, a write-through cache policy may be used to assure that all of the hiberfile data saved in cache will also be stored on the disk drive during the hibernation, so that if the cache and the disk drive are separated during hibernation, the full correct hiberfile data will still be available for a resume operation.

FIG. 1 shows a computer system, according to an embodiment of the invention. In the illustrated system 100, one or more processors 110 may be used to provide overall control and operation of the system, while a memory/graphics hub 120 and an input-output (I/O) hub 130 may be used to provide an interface between the processor(s) 110 and much of the rest of the system. A communications controller 140 is also shown. The illustration is for wireless communication, as indicated by the antenna(s) 142, but other types of communication may be implemented instead of, or in addition to, that shown. A power source 150 may be used to provide electrical power for the system. Some embodiments may use a portable power source such as a battery, while other embodiments may use a power source that plugs into an electrical outlet. Still other embodiments may include both.

The system is also shown with three types of storage—volatile memory, non-volatile (NV) memory, and disk storage, though this particular combination should not be seen as a limitation on the embodiments of the invention. A volatile memory controller 170 may control operations of a volatile memory array 175, to provide fast read and write speeds. In some embodiments this may be some form of dynamic random access memory (DRAM), but other types of volatile memory may also be used. In some embodiments, the volatile memory may be used as the main operating memory in the system. A disk controller 180 may be used to control writing to and reading from a disk drive 185.

Another memory controller 160 may be used to control reading, writing, and erase operations for non-volatile (NV) memory array 165. This may use any feasible type of NV memory technology, such as but not limited to NAND flash memory, NOR flash memory, phase-change memory, ferroelectric memory, etc. This NV memory sub-system 160/165 may be used as a cache memory for disk sub-system 180/185. In some embodiments the NV memory may be an Intel Turbo Memory™ (ITM) or a similar NV memory sub-system, but other embodiments may use other NV memories. During runtime, this cache memory may be used to provide fast access to frequently-used or recently-used data on the disk, especially during times when the disk drive has been spun down to reduce power consumption. However, when the system goes into a hibernate mode to save even more power, this NV cache memory may be used to save hiberfile data, so that the system may be brought from the hibernate mode to an operational mode quickly upon resume from the hibernate mode. Time may be saved during resume because the system won't have to wait for the disk to spin up to begin retrieving the cached hiberfile data. Even after the disk has spun up, the system may not have to wait for time-consuming disk accesses for the hiberfile data that was saved in the cache. In some embodiments, the disk drive itself may contain some embedded NV memory to be used as a disk cache. Such disk drives are sometimes called hybrid hard disk (HHD) drives, although they may be referred to by other names. The NV memory 160/165 may be used instead of, or in addition to, that embedded NV memory.

Since the NV memory 160/165 is used as a disk cache, it is reasonable to assume that the contents of this cache memory will be duplicated on the disk drive, even if there is some delay in making that duplicate copy. However, depending on the physical configuration of the memory and disk drive, it is possible that the NV memory sub-system and the disk drive sub-system may be separable from each other before the duplicate copy has been made, and the contents of the cache will therefore not be identical to the corresponding data on the disk. For example, a hibernating system could have either its disk drive or its NV cache replaced before the resume operation takes place. In such a case, it is important that the surviving storage (either the disk drive or the cache memory) have the correct hiberfile data in it, so that the system can be brought back to operation with the correct data. To make sure that both the disk drive and disk cache have the correct hiberfile data, a write-through cache policy may be used, so that data written into the cache memory is immediately written to the disk drive as well.

System 100 is shown as one example of how such a system might be configured, but other embodiments may have other arrangements, particularly in regard to hubs 120, 130, and controllers 160, 170, and 180. Although the term 'hibernate', as well as the 'S0' through 'S4' power states, may be used in this document, various embodiments of the invention are not limited to systems that use these terms, or that follow the precise definitions that may have been published for these terms. The low power mode in the description and claims may be any low power mode that causes the disk to be spun down and the volatile main memory to loose all or part of its contents.

When used within this document, the following terms will have the following meanings:

Transient Block Table: a table that represents a set of erased blocks that are available for the purpose of hiberfile caching. Some or all of these erased blocks may have been erased to be available for subsequent write operations during runtime, but are used for instead for hiberfile caching when entering a low power mode. During runtime, the memory space represented by these erased blocks is also called the Reserve Space, since it represents the erased blocks that are being reserved for subsequent use.

Hiberfile Mapping Table: a table that maps the physical NV memory addresses to the disk logical block addresses. The table provides a simple way for a driver or Option ROM to retrieve the cache-inserted hiberfile data.

Unpopulated Pinned Data Set—Pinned data is data that the operating system intends to stay in the cache memory during both runtime and hibernate operations, as opposed to data that is frequently replaced in that cache during runtime The unpopulated pinned data set is the set of data that is intended to be inserted into the cache once it's been written to the disk, but has not yet been written to the disk drive.

The techniques described herein provide for storing the hiberfile data of the operating system (e.g., Windows, Vista, Linux, etc., though other operating systems may also be used) in NV memory during S0-to-S4 suspend, and recovering it during S4-to-S0 resume, where S0 is the operational state and S4 is the hibernate state, as recognized by the operating system. The process consists of these key components, each of which is described in the subsequent paragraphs:

1) Processing during Suspend Event Time.
2) Processing during Suspend, Hiberfile Write Time.
3) Processing during Resume, Hiberfile Read Time.
4) Processing during Resume, Driver Cleanup Time.
5) Error handling.

Figure 2:
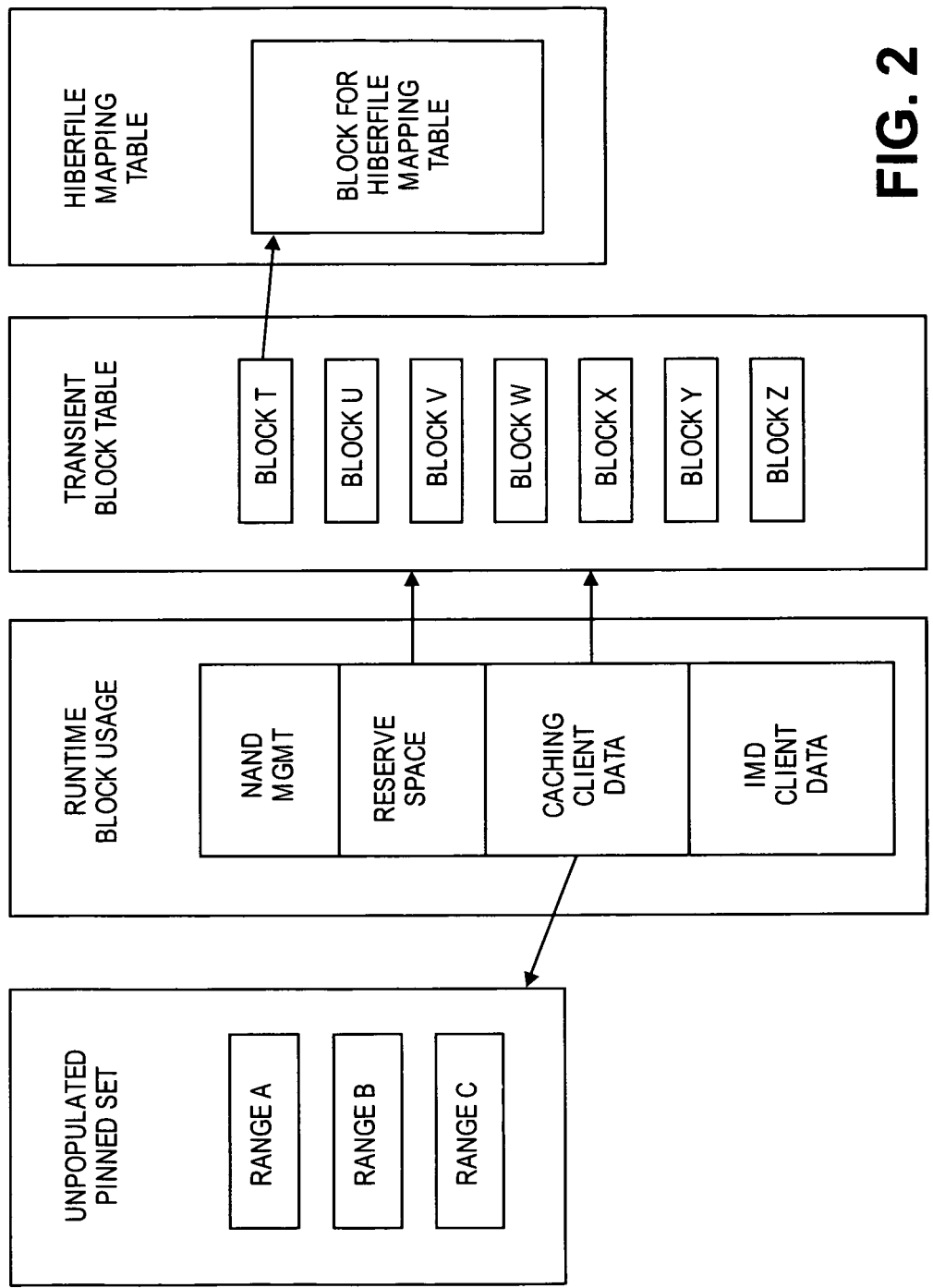
FIG. 2 shows various data sets, blocks, and tables used during a suspend event, according to an embodiment of the invention.
Figure 3:
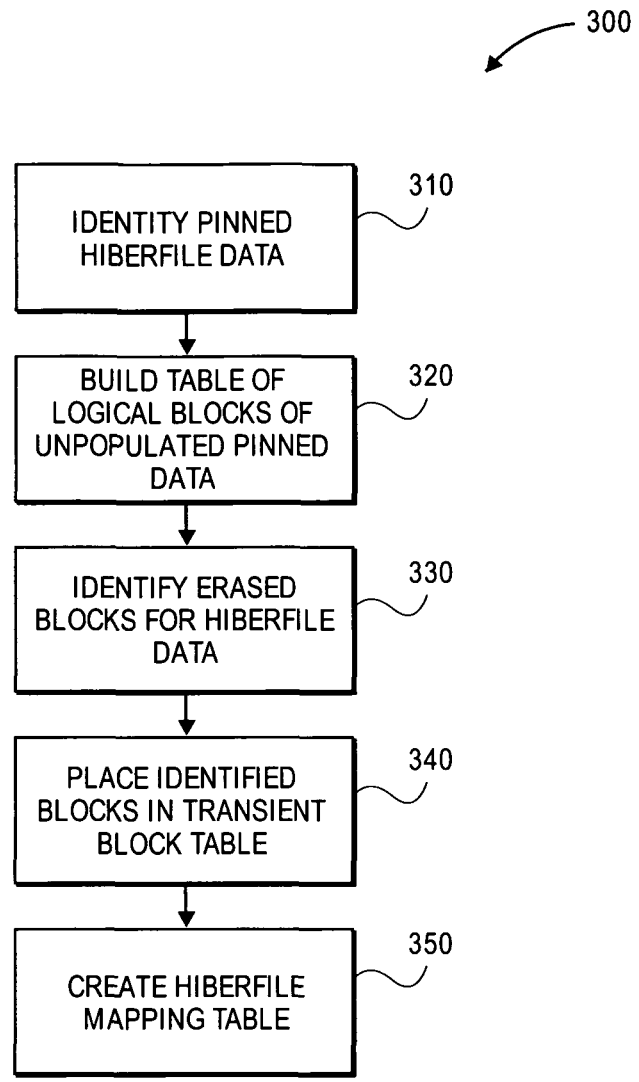
FIG. 3 shows a flow diagram of a method of operating during the suspend event, according to an embodiment of the invention.

Processing During Suspend Event Time:

FIG. 2 shows various data sets, blocks, and tables used during a suspend event, according to an embodiment of the invention. FIG. 3 shows a flow diagram of a method of operating during the suspend event, according to an embodiment of the invention. At suspend time, the runtime driver is preparing for hibernation. The preparation for caching the hiberfile includes identifying what hiberfile data is intended to be cached by the operating system (which may be identified as the portion of pinned data referred to as the 'unpopulated pinned set'), then identifying where all the cached hiberfile data will be stored in the cache, and finally identifying the cache memory that will report the cached hiberfile data to an Option ROM during the resume phase (such as the Option ROM for the NV cache memory sub-system.) Specifics on this process may include the following, with references made to FIGS. 2 and 3:

In flow diagram 300, at 310 the pinned hiberfile data is identified. The runtime driver may build a table of hiberfile data (shown as range A, B, and C) for the Unpopulated Pinned Data Set at 320. The examples described here assume that each range represents a logical block that is sized to fit into one erased physical NV memory block, though other embodiments may use different techniques. No other data, besides hiberfile data, is expected in the unpopulated pinned set at this point. The table of hiberfile data may be organized by increasing logical block address (LBA) in order to optimize the writing process. The driver may also determine how many erased blocks are needed to store this data set. At 330, the available erased blocks from the Reserve Space are identified that may be used to store the pinned hiberfile data. In some embodiments, if erased blocks are still available after blocks are found for all the pinned hiberfile data, some or all of those additional blocks may be identified to store some of the unpinned hiberfile data. The identity of all these available blocks (shown as blocks T-Z) may then be placed into a Transient Block Table at 340. The Hiberfile Mapping Table may then be created at 350 to assign the logical block of each range to a specific erased block in the Transient Block Table. The Hiberfile Mapping Table may then be placed into one of the blocks in the Transient Block Table (block T in the example). During a resume operation, the Option ROM for the NV memory may easily access this block and retrieve the mapping table. If the Hiberfile Mapping Table is too big to fit into one block, it may be placed into multiple blocks with suitable chaining to tie them together.

Figure 4:
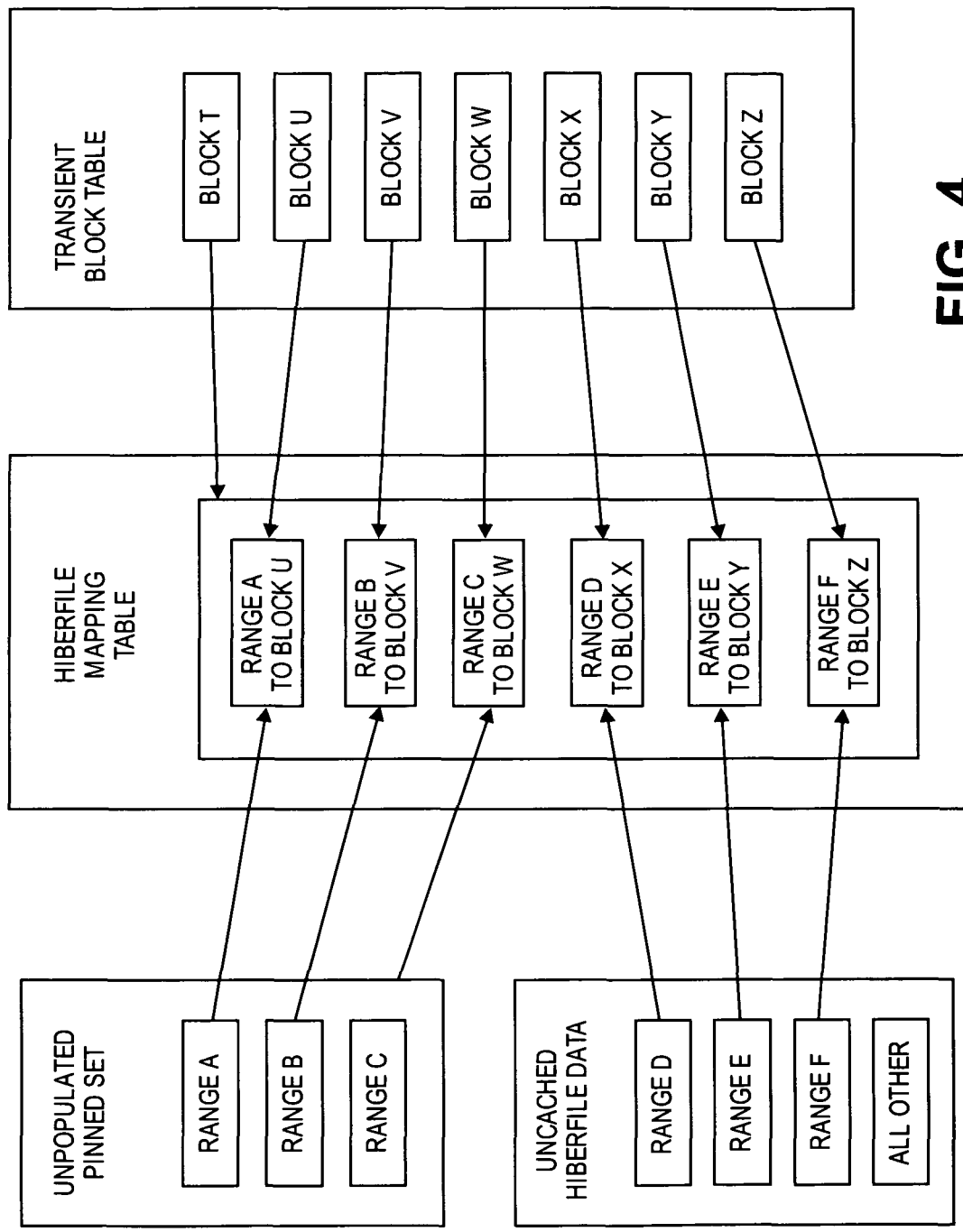
FIG. 4 shows various data sets, blocks, and tables used during hiberfile write time, according to an embodiment of the invention.
Figure 5:
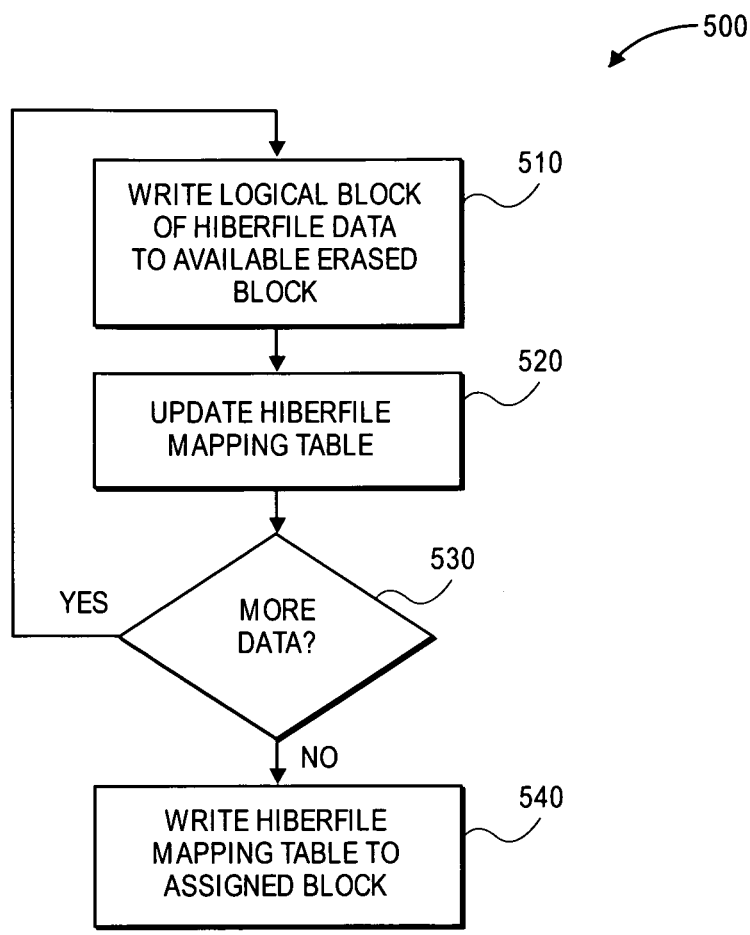
FIG. 5 shows a flow diagram of a method of operating during the hiberfile write time, according to an embodiment of the invention.

Processing During Suspend, Hiberfile Write Time:

FIG. 4 shows various data sets, blocks, and tables used during hiberfile write time, according to an embodiment of the invention. FIG. 5 shows a flow diagram of a method of operating during the hiberfile write time, according to an embodiment of the invention. In flow diagram 500, at 510 the runtime driver may write a logical block of hiberfile data to an available block identified in the Transient Block Table, and then update the Hiberfile Mapping Table at 520 to reflect completion of this action. If more hiberfile data remains to be written, as determined at 530, this process may be repeated for that data. First, the unpopulated pinned set may be accommodated in this manner, since the unpopulated pin set is already planned for insertion into cache, and all blocks to use this data were already identified during the suspend even processing. Once the unpopulated pin set has been accommodated, the uncached hiberfile data may be copied into available blocks identified by the Transient Block Table. In the example of FIG. 4, the unpopulated pin set is placed in blocks U, V, and W, while the uncached hiberfile data is place in blocks X, Y, and Z. Once the hiberfile data has been saved to cache, the updated Hiberfile Mapping Table may be written to its assigned block at 540.

Various rules may be implemented to provide for an orderly process. For example, some or all of the following rules may be followed, though this example should not be considered a limitation on the various embodiments of the invention. First the unpopulated pinned set may be given priority over unpinned data when determining what hiberfile data will be saved. Then the unpinned data may be saved on a first-come, first-served basis. Specifics on this process may include the following:

Process hiberfile data write requests—determine Pages to be written to: first it should be determined whether the written range is represented in the unpopulated pinned set table or not. If the range is represented in this table, then the data is written to the pages reserved for it by the Transient Block Table, as previously identified during the suspend phase. If the range is not represented in this table, then the first available page may be found from the Transient Block Table.

Process hiberfile data write requests—Write to non-volatile storage: hiberfile data is written to the NV cache at this time and, in the case of a write-through cache policy, is simultaneously written to the hard disk. To do this the commands may be started on each device, then ping-pong polling (or alternately, hardware interrupt, if the OS supports it) may be used with both storage devices until both have completed. Upon completion the Hiberfile Mapping Table is updated to indicate all written Pages.

Save Hiberfile Mapping Table at final shutdown—all entries in this table may now be sorted by LBA in order to facilitate faster Option ROM recovery, and then the table may be written to the previously-identified block in the NV cache.

Figure 6:
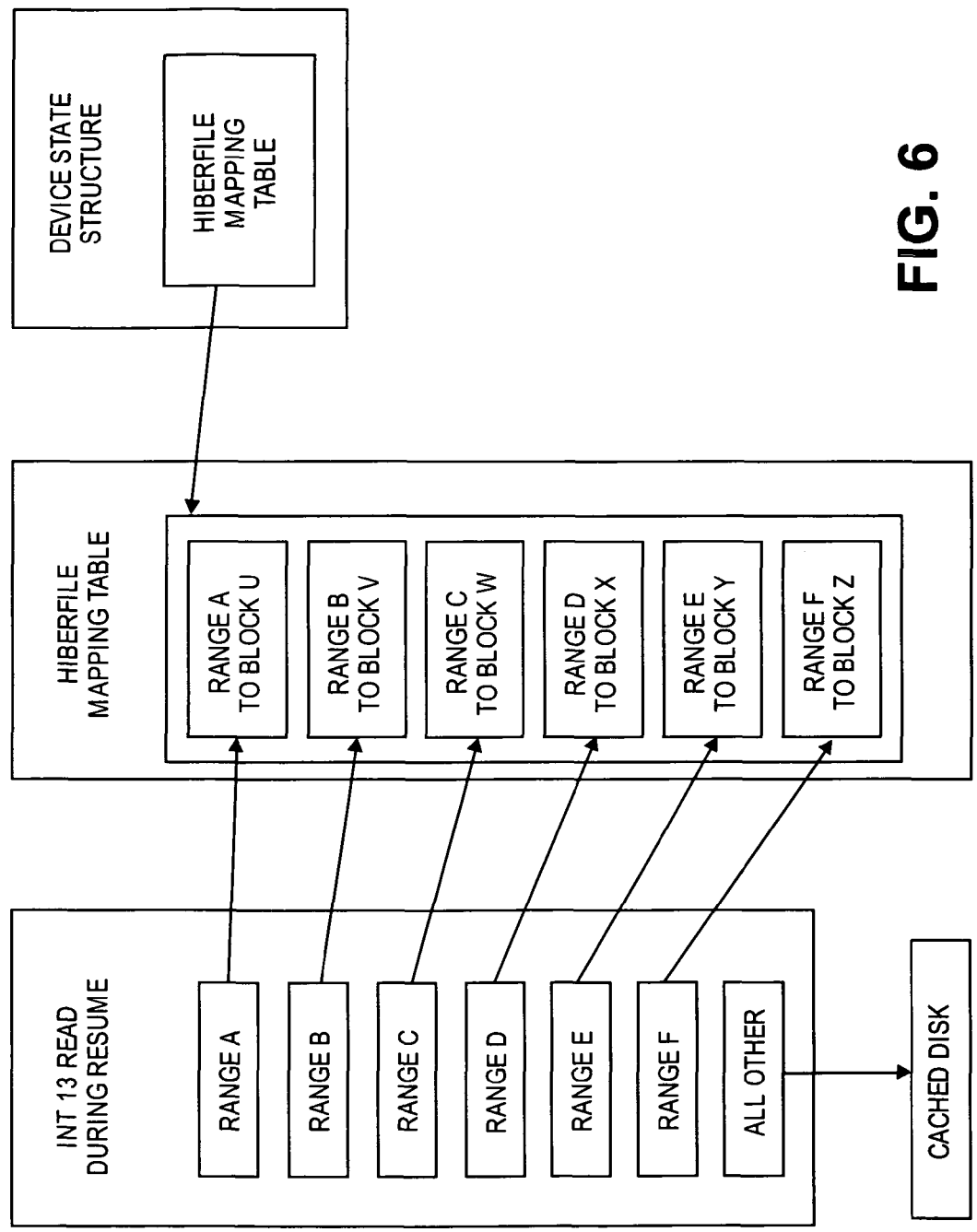
FIG. 6 shows various data sets, blocks, and tables used during hiberfile read time, according to an embodiment of the invention.
Figure 7:
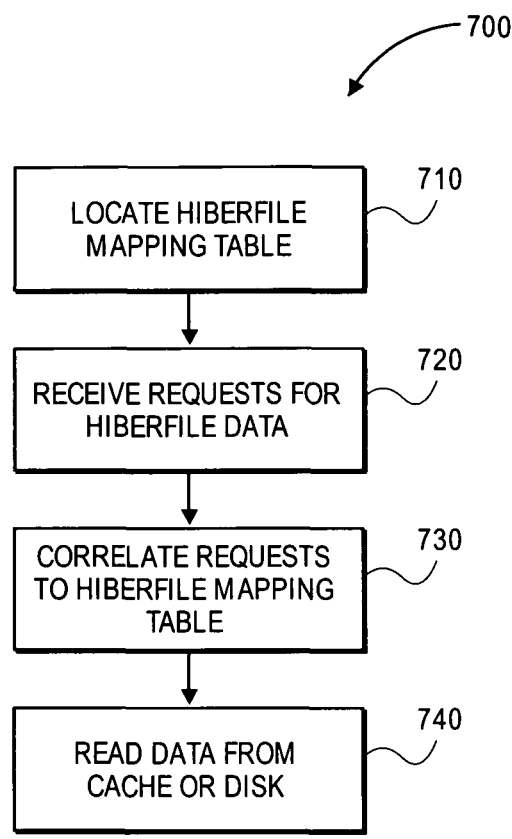
FIG. 7 shows a flow diagram of a method of operating during the hiberfile read time, according to an embodiment of the invention.

Processing During Resume, Hiberfile Read Time:

FIG. 6 shows various data sets, blocks, and tables used during hiberfile read time, according to an embodiment of the invention. FIG. 7 shows a flow diagram of a method of operating during the hiberfile read time, according to an embodiment of the invention. During resume the hiberfile data may be read from cache by the operating system's loader. In some embodiments, all hiberfile reads start with BIOS Intl3 disk request calls, though other embodiments may use other techniques. In some embodiments, the Option ROM for the NV memory may play a significant role in servicing Intl3 requests.

In the flow diagram 700, the location of the Hiberfile Mapping Table is discovered at 710. (In the examples previously shown, it was located in block T). In some embodiments this location may be found by examining the last entry in a device state structure, but other embodiments may use other techniques. As subsequent requests to read the hiberfile data are received at 720, these requests may be correlated to the Hiberfile Mapping Table at 730. At 740, the requested data may then be read from the cache if an entry is found in the Hiberfile Mapping Table, or from disk if it is not.

In some embodiments, the Option ROM for the cache memory sub-system can only read small increments of the hiberfile data at a time (e.g., a page or a sector), so multiple reads may be necessary. This multiple-read process may be more efficient if the requests are sequential and the mapping table is sorted by LBA. In some embodiments, system Intl9 may be used to direct the system to the boot sector to trigger disk boot load, while system Intl3 may be used to trigger each read/write request to the disk sub-system, but other embodiments may use other techniques.

Figure 8:
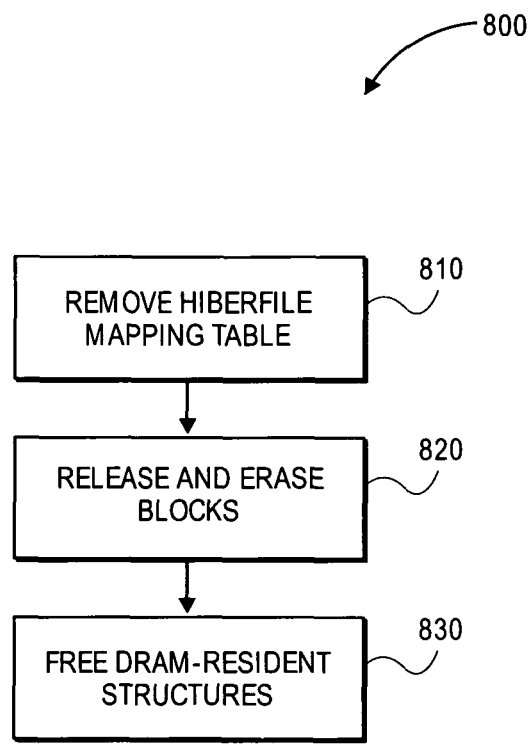
FIG. 8 shows a flow diagram of a method of cleaning up after the hibernate period.

Processing During Resume, Driver Cleanup Time:

FIG. 8 shows a flow diagram of a method of cleaning up after the hibernate period. During this time the driver may prepare for normal system operation. In the illustrated flow diagram 800, at 810 the driver may remove the Hiberfile Mapping Table from the cache block(s) in which it resided, and remove any reference indicating that it is located there. In some embodiments this would include removing a pointer from the device state structure. At 820, the blocks of cache memory that had been used to hold the hiberfile data may be released. Some of these may subsequently be erased so they can rejoin the Reserve Space of erased blocks that are available for runtime usage. Others of these, which contain potential future hiberfile data that hasn't changed, may be left intact. At 830, the DRAM-resident memory structures that were needed for the hiberfile processing may also be released. For example, these may include DRAM memory-resident copies of the Unpopulated Pinned Set Table, the Transient Block Table, and the Hiberfile Mapping Table.

Error Handling:

Various possible error conditions are listed below, as well has examples of how these conditions may be handled. This is only a partial list, and should not be read as a limitation on possible error conditions, or on methods of handling these or other error conditions.

During Hiberfile Write Time, failures might occur in writing a page, so the driver must relocate the data already written to the current block, then identify a new available block and move all data currently written in the failing block into the new block, then retry the current page write. Writing hiberfile data to the cache may have to terminate if no more pages are available.

If a write failure occurs when hiberfile data is being written to NV memory, or a read failure occurs when the hiberfile data is being read from NV memory during a resume operation, then the entire NV hiberfile image may be invalidated and all read data during the resume phase may come from disk. In some embodiments, the read or write operation may be attempted multiple times before declaring the operation a failure. Using a write-through cache policy when writing the hiberfile data may make it more likely the hiberfile data will end up on the disk, thereby increasing the chances that the resume operation will be completed successfully.

At final shutdown, after hiberfile writes have occurred, a failure could occur while writing the Hiberfile Mapping Table into the identified block. If this occurs, the location of the block containing the Hiberfile Mapping Table may be updated so the NV memory Option ROM will not attempt to process it.

During the Resume and Hiberfile Read Time, if the Hiberfile Mapping Table is invalid then all hiberfile reads may be directed to the disk. For reads that are directed to the cache, the NV memory Option ROM could fail. If this happens, the boot loader may automatically abort the resume process and invoke a cold boot. Alternatively, the cached hiberfile data may be read from the disk if it was written in parallel with cache writes during hiberfile write time.

During a resume operation, the NV memory Option ROM may copy the Hiberfile Mapping Table address to another location in NV memory, so that if a power loss occurs during the resume operation, another resume may be attempted. Copying the table to another device state structure would allow the subsequent system start to try the resume from cache again, but a maximum retry limit may be implemented if persistent failures in the resume operation occur.

Malicious user scenarios may occur when a user corrupts the hiberfile on disk by way of an alternate OS. A resume from cache may provide correct resume data, but the user may not expect this behavior. Some embodiments may query the user to determine the desired course of action. This could be satisfied by Option ROM detection. If resume from cache fails, then re-direction of reads to the disk-based hiberfile may result in a failed resume, whereupon the OS may resort to a cold OS boot.

During Resume, Driver Cleanup Time, if a power-fail occurs before completing the driver cleanup steps then the entire cache may be invalidated, so deleting the table early on will have no ill-effects.

The driver may detect a power-fail recovery during hibernation and recover from the failure by discovering all non-erased, hiberfile-used blocks and adding them back into the USED pool, freeing them up for use again.

HHD and SSD Considerations:

Some embodiments of this invention may be applied to a Hybrid Hard Drive (HHD) or Solid State Disk (SSD) by expanding on what either can do today. The HHD and SSD may only pin hiberfile data that has been reported to it by the OS, however embodiments of this invention may expand on this by adding more hiberfile data in the cache than what the OS requests. A custom "Start of Hibernation" command may be created to signal to the HHD or SSD that hiberfile data write is starting, and to automatically pin as much of it as possible as the file is being written. And "End of Hibernation" command may indicate when to stop this auto-pin process.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A computer system, comprising:
a processor;
a disk drive coupled to the processor; and
a non-volatile (NV) memory coupled to the disk drive to operate as a cache memory for the disk drive during runtime operations and to operate as a storage for hiberfile data during a low power state, the low power state being relative to a higher power state of the runtime operations, the NV memory to be used to provide access to relatively frequently-used data on the disk drive when the disk drive has been spun down during the runtime operations;
wherein a reserve space in the NV memory during runtime operations is to be used as storage for the hiberfile data, the reserve space being erased blocks that are available to be used during the runtime operations to store the hiberfile data, the NV memory to use a write-through cache policy that results in all of the hiberfile data that is cached in the NV memory also being stored in the disk drive during the low power state;
also wherein, in determining the hiberfile data that is to be saved, unpopulated pinned data is given priority over unpinned data.

2. The computer system of claim 1, wherein the NV memory comprises a NAND flash memory.

3. The computer system of claim 1, wherein the NV memory is to cache more hiberfile data than requested to be pinned in the NV memory by the operating system.

4. The computer system of claim 1, wherein at least one memory block of the NV memory is to contain a table to map hiberfile data to the memory blocks containing the hiberfile data.

5. The computer system of claim 1, wherein the disk drive and the NV memory are physically separable from each other during the low power state.

6. The computer system of claim 1, further comprising a battery to power the NV memory.

7. The computer system of claim 1, further comprising a wireless communications controller coupled to the processor.

8. An apparatus, comprising:
a non-volatile (NV) memory to be coupled to a disk drive to operate as a cache memory for the disk drive during runtime operations and to operate as a storage for hiberfile data during a low power state, the low power state being relative to a higher power state of the runtime operations, the NV memory to be used to provide access to relatively frequently-used data on the disk drive when the disk drive has been spun down during the runtime operations;
wherein a reserve space in the NV memory during runtime operations is to be used as storage for the hiberfile data, the reserve space being erased blocks that are available to be used during the runtime operations to store the hiberfile data, the NV memory to use a write-through cache policy that results in all of the hiberfile data that is cached in the NV memory also being stored in the disk drive during the low power state;

also wherein, in determining the hiberfile data that is to be saved, unpopulated pinned data is given priority over unpinned data.

9. The apparatus of claim 8, wherein the NV memory comprises a NAND flash memory.

10. The apparatus of claim 8, wherein the NV memory is to cache more hiberfile data than requested by the operating system.

11. The apparatus of claim 8, wherein at least one memory block of the NV memory is to contain a table to map hiberfile data to the memory blocks containing the hiberfile data.

12. A method, comprising:

using a non-volatile (NV) memory as a disk cache during runtime operations in a computer system having a disk drive, the NV memory to be used to provide access to relatively frequently-used data on the disk drive when the disk drive has been spun down during the runtime operations; and using the NV memory to store hiberfile data during a low power state of the computer system, the low power state being relative to a higher power state of the runtime operations, wherein the NV memory is to use a reserve space in the NV memory as storage for the hiberfile data, the reserve space being erased blocks that are available to be used during the runtime operations to store the hiberfile data, the NV memory to use a write-through cache policy that results in all of the hiberfile data that is cached in the NV memory also being stored in the disk drive during the low power state;

also wherein, in determining the hiberfile data that is to be saved, unpopulated pinned data is given priority over unpinned data.

13. The method of claim 12, further comprising resuming operation from the low power state, said resuming comprising reading said hiberfile data from the disk drive, responsive to either of: 1) a write failure when writing the hiberfile data to the NV memory before entering the low power state, or 2) a read failure during said attempting to read the hiberfile data from the NV memory.

14. The method of claim 12, further comprising resuming operation from the low power state, said resuming comprising copying an address of a hiberfile mapping table to a new location in the NV memory, the new location to be used if a power failure during the resume operation causes the resume operation to be retried.

15. The method of claim 12, wherein the NV memory is to store more pinned hiberfile data than requested by the operating system.

16. The method of claim 12, wherein said using the NV memory to store hiberfile data comprises using a table to map hiberfile data to available memory blocks in the NV memory.

17. The method of claim 12, further comprising physically replacing one of the NV memory and the disk drive in the computer system during the low power state.

18. A non-transitory a tangible machine-readable medium that contains instructions, which when executed by one or more processors result in performing operations comprising:

using a non-volatile (NV) memory as a disk cache during runtime operations in a computer system having a disk drive, the NV memory to be used to provide access to relatively frequently-used data on the disk drive when the disk drive has been spun down during the runtime operations; and using the NV memory to store hiberfile data during a low power state of the computer system, the low power state being relative to a higher power state of the runtime operations, wherein the NV memory is to use a reserve space in the NV memory as storage for the hiberfile data, the reserve space being erased blocks that are available to be used during the runtime operations to store the hiberfile data, the NV memory to use a write-through cache policy that results in all of the hiberfile data that is cached in the NV memory also being stored in the disk drive during the low power state;

also wherein, in determining the hiberfile data that is to be saved, unpopulated pinned data is given priority over unpinned data.

19. The medium of claim 18, wherein the operations further comprise resuming operation from the low power state, said resuming comprising reading said hiberfile data from the disk drive, responsive to either of: 1) a write failure when writing the hiberfile data to the NV memory before entering the low power state, or 2) a read failure during said attempting to read the hiberfile data from the NV memory.

20. The medium of claim 18, wherein the operations further comprise resuming operation from the low power state, said resuming comprising copying an address of a hiberfile mapping table to a new location in the NV memory, the new location to be used if a power failure during the resume operation causes the resume operation to be retried.

21. The medium of claim 18, wherein the operation of using the NV memory to store hiberfile data comprises using a table to map hiberfile data to available memory blocks in the NV memory.

22. The medium of claim 21, wherein the operations further comprise storing the table in at least one available block in the NV memory.

* * * * *